INVENTOR
WILLIAM VAHS

ATTORNEY

March 15, 1955

W. VAHS 2,704,131

HYDRAULIC POWER TRANSMISSION SYSTEM FOR VEHICLE
PROPULSION AND IMPLEMENT OPERATION

Filed Aug. 11, 1953

INVENTOR
WILLIAM VAHS

Paul O. Pippel

ATTORNEY

United States Patent Office 2,704,131
Patented Mar. 15, 1955

2,704,131

HYDRAULIC POWER TRANSMISSION SYSTEM FOR VEHICLE PROPULSION AND IMPLEMENT OPERATION

William Vahs, Hamilton, Ontario, Canada, assignor to International Harvester Company, a corporation of New Jersey Application August 11, 1953, Serial No. 373,634

11 Claims. (Cl. 180—66)

This invention relates to a hydraulic power transmission system for vehicles wherein hydraulic fluid is employed for transmitting driving force from the vehicle engine to the traction devices, and wherein the same transmission system is used for operating hydraulic rams carried by the vehicle. The invention is particularly applicable to self-propelled implements such as windrowers, combines, etc. having parts to be operated by the rams.

In the past, in a system of this type wherein rams are connected in the same circuit and receive fluid under pressure from the same source that supplies the propelling devices, the rams were operable only so long as the traction devices were operated and could not be actuated when the vehicle was at rest. The present invention, therefore, contemplates and has for its object the provision of an improved hydraulic transmission system for driving a vehicle and for operating power units such as hydraulic rams.

Another object of the invention is to provide in a power transmission system for a vehicle wherein fluid under pressure is supplied to fluid motors for operating the traction devices, hydraulic rams incorporated in the fluid system to receive fluid under pressure from the same source as the traction devices, and means incorporated in the system for operating the rams when the traction devices are at rest.

A further object of the invention is to provide in a hydraulic transmission system for a tractive vehicle such as a self-propelled windrower or the like, a fluid circuit having mounted therein fluid motors for operating the traction devices of the vehicle and hydraulic rams receiving fluid from the fluid motors, and valve control means between the rams and the fluid motors operative to draw fluid direct from the pressure source and deliver it under pressure to the rams when the fluid motors are at rest.

Other objects and advantages of the invention will become clear from the following detailed description when read in conjunction with the accompanying drawings, wherein:

Figure 1 is a schematic representation of a fluid power transmitting system according to this invention adapted particularly for use with vehicular agricultural machines such as combines, self-propelled windrowers, and the like;

Figure 1:
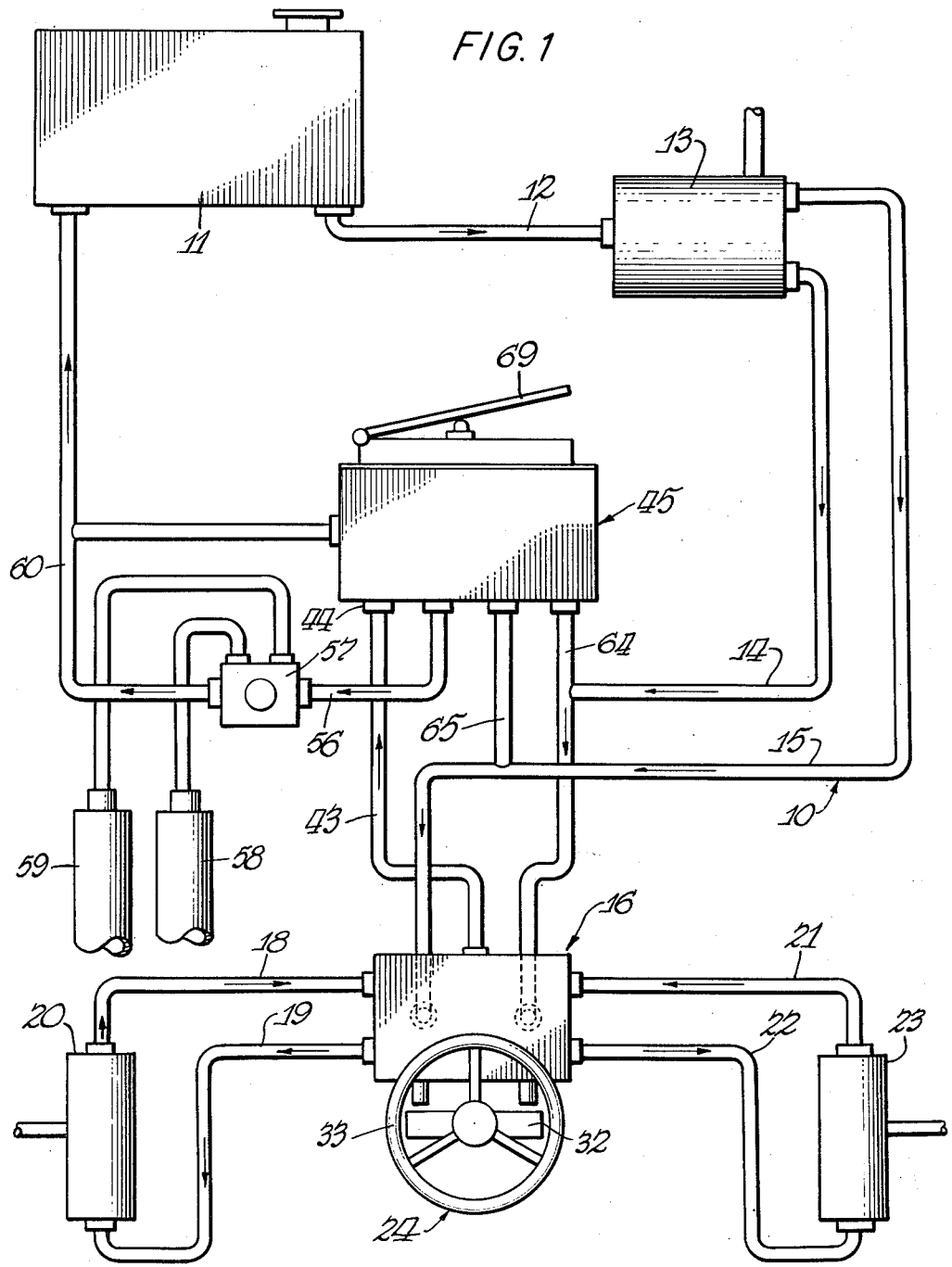

Referring to the drawings, the hydraulic power transmission system indicated diagrammatically in Figure 1 comprises a fluid circuit, generally designated by the numeral 10, including an oil reservoir 11 connected by a pipe line 12 to a fluid pump 13, preferably of the double gear type having pressure relief valves incorporated therein. The tank 11, line 12, and pump 13 constitute a source of fluid under pressure for the hydraulic system of this invention.

Figure 5:
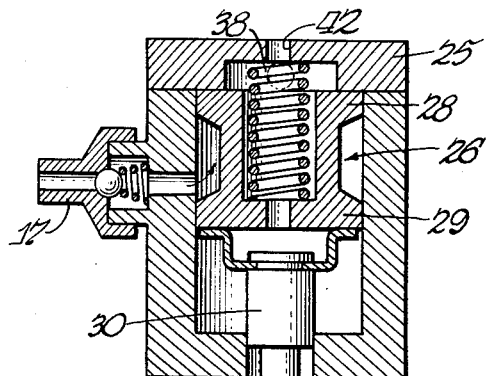
Figure 5 is a sectional view on the line 5—5 of Figure 4.

A pair of conduits 14 and 15 conduct fluid under pressure from the pump 13 to opposite sides of a drive control valve 16, a check valve 17 (see Figure 5) being provided at each port of entry of the conduits 14 and 15 into the control valve 16. Fluid under control of the valve 16 is conducted through lines 18 and 19 to the left hand fluid motor 20, and through conduits 21 and 22 to the right hand fluid motor 23 for the traction devices such as the drive wheels, not shown, of a self-propelled farm implement, also not shown. Fluid from the control valve 16 passes in the direction of the arrows through conduits 19 and 22 to the respective fluid motors 20 and 23, and fluid is returned therefrom in the direction of the arrows through conduits 18 and 21, respectively, to the control valve 16.

The supply of fluid to the motors is under the control of the machine operator and is regulated by manipulation of the steering mechanism 24 indicated diagrammatically in Figures 1 to 5. The construction and operation of the valves in the steering or drive valve control mechanism is indicated diagrammatically in Figures 2 to 5 wherein a casing 25 houses a pair of valves 26 and 27. Each of these valves is of the spool type and is provided with a pair of flanges 28 and 29. The valves are provided, respectively, with stems 30 and 31 which are engaged in a manner indicated schematically in the drawings by a bar 32 actuated by manipulation of the steering wheel 33 of the steering mechanism, in a manner which will hereinafter become clear.

Figure 2:
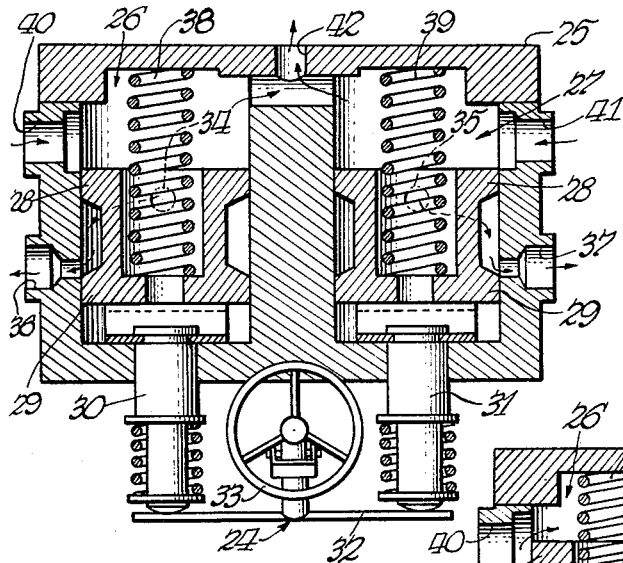
Figure 2 is a sectional view of the valve arrangement in the control mechanism for the fluid motors operating the traction devices of the vehicle.

In the position of the parts shown in Figure 2 the fluid motors 20 and 23 are being operated to drive both drive wheels forwardly. In this position fluid under pressure flowing from the pump 13 through the conduits 14 and 15 passes through the respective check valves 17 to ports 34 and 35. From these ports fluid flows in the direction of the arrows to outlets 36 and 37 connected with conduits 19 and 22 for conveying the fluid to the respective motors for driving the vehicle. The valves 26 and 27 are biased to the position indicated in Figure 2 by springs 38 and 39.

In the position of the valve parts of the steering control mechanism shown in Figure 2, fluid entering the ports 34 and 35 from the pressure source passes through the respective outlets 36 and 37 to the driving motors 20 and 23. Fluid returning from the motors 20 and 23 in the direction of the arrows passes through the conduits 18 and 21 into ports 40 and 41, respectively, above the outlets 36 and 37, and is directed to a common discharge outlet 42 where it proceeds through a conduit 43 to the inlet port 44 of a brake valve control assembly 45.

Figure 6:
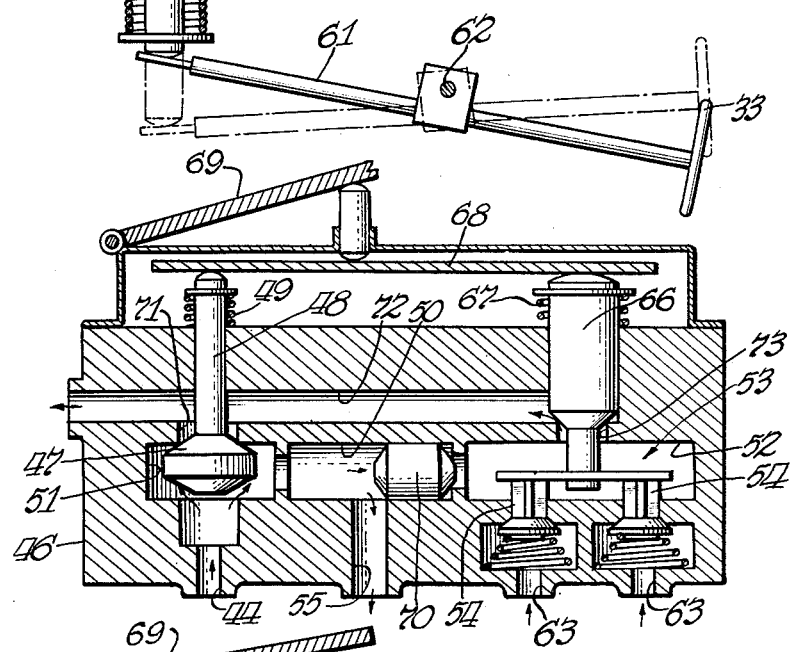
Figure 6 is a sectional view of a braking valve for controlling the flow of fluid from the fluid motor control mechanism to the ram control mechanism.
Figure 7:
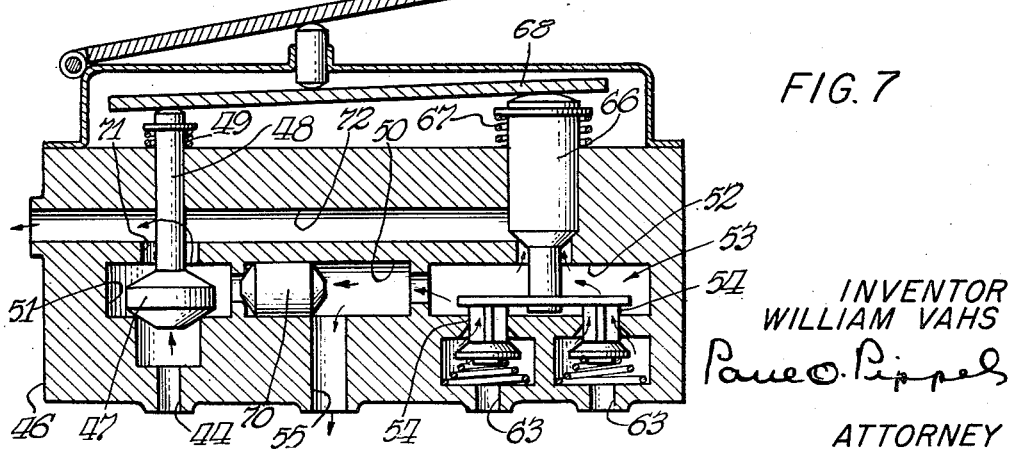
Figure 7 is a view similar to Figure 6 showing the valve control means in a different operating position.

The brake valve assembly is shown schematically in Figures 6 and 7 and comprises a housing 46 in which is mounted a valve 47 having a stem 48 slidable in the housing and biased to the opening position indicated in Figure 6 by a spring 49. In this position fluid entering the port 44 is directed into a passageway 50, which connects the valve chamber 51 of the valve 47 with a valve chamber 52 of a release valve structure indicated at 53, which comprises a pair of elements 54 in a closed position when valve 47 is open and having a function which will hereinafter appear. Fluid entering the port 44, as pointed out before, is directed into the passage 50 into which opens a passageway 55 through which fluid flows in the direction of the arrows into a conduit 56, and through it to a ram control valve structure 57, by means of which fluid is directed to a pair of hydraulic cylinders 58 and 59. These cylinders 58 and 59 may be employed for any suitable purpose; for example, to actuate the platform and reel of a windrow harvester, under the control of the valve structure 57. The valve control mechanism 57 forms the subject of a copending U. S. application, Serial No. 339,827, filed March 2, 1953, and a detailed description thereof or of the implement with which it is associated is not indicated since these details form no part of the present invention. From the ram control valve mechanism 57 fluid returns through conduit 60 to the reservoir 11.

In the position of the motor control valve parts shown in Figure 2, both drive motors 20 and 23 are operating and the drive wheels to which they are connected are moving forwardly. Fluid under pressure, therefore, flows from the motors back through the steering or drive control valve and the brake valve mechanism to the ram units, so that they may be operated while the tractor is in motion.

Figure 3:
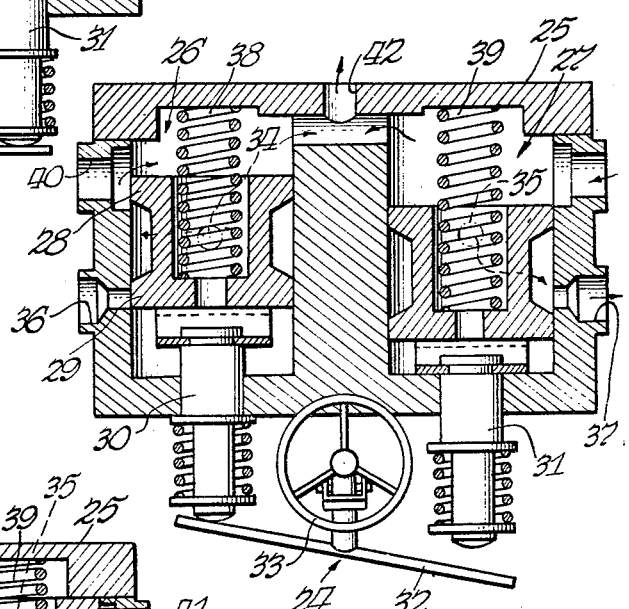
Figure 3 is a sectional view similar to Figure 2 of the valve control mechanism for the fluid motors, showing diagrammatically the manner in which they are actuated by the steering mechanism to operate the traction devices.
Figure 4:
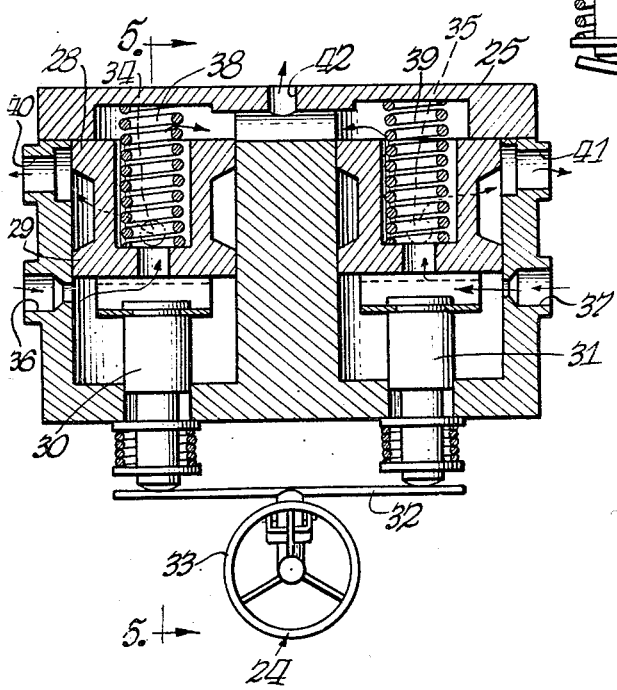
Figure 4 is a view similar to Figures 2 and 3 showing another position of the valve control mechanism.

The manipulation of the steering control valve 16 to suitably operate the drive motors 20 and 23 for turning and reversing the tractor is indicated by the position of the parts in Figures 3 and 4. In Figure 3, for example, by rotation of the steering mechanism 24, one end of bar 32 aggressively engages and depresses valve stem 30 and the spool valve 26 moves to a position in which one of the flanges thereof closes the port 36 while leaving the port 40 open. The valve 27 remains in open position with the fluid flowing from the inlet port 35 out through the port 37 to the motor 23 to operate the associated traction device in a forward direction. In the position of the parts of valve 26, however, fluid entering the port 34 cannot pass through the outlet 36, but instead takes the direction of the arrow and flows directly to the port 42 and to the brake valve. Thus, the driving motor 20 and its associated traction device are stopped.

In the position of the parts shown in Figure 4, both of the valves 26 and 27 have been moved to their extreme positions by engagement of the bar 32 with the stems 30 and 31. This is accomplished by rocking of the steering column 61 bodily about a pivot axis 62 from the dotted line to the solid line position shown. In the position of the parts shown in Figure 4, fluid entering the ports 34 and 35 passes through the ports 40 and 41 to the motors 20 and 23 from another direction to reverse their operation and, therefore, the direction of operation of the associated traction devices. Fluid returning from the motors enters the ports 36 and 37 and travels in the direction of the arrows through the center of the valves 26 and 27, out through the port 42 to the brake control valve. The check valve 17 provided at each of the inlets 34 and 35 into the housing 25 functions to prevent fluid return therethrough under adverse conditions such as occur when the vehicle is stopped on a hill, for example.

As pointed out before, it is important when the vehicle is stopped that the machine operator still be able to control and operate his rams 58 and 59 as needed. In order to accomplish this, the valve 53 is provided in the housing 46 of the brake control valve. The dual elements 54 of the valve 53 are in the closed position in Figure 6. A pair of ports 63 are connected by conduits 64 and 65 with the respective conduits 14 and 15 conducting fluid from the pressure source, and a valve stem 66 is slidable in the housing 46 and biased to the position of Figure 6 by a spring 67. An actuating bar 68, indicated diagrammatically in the drawings, is operated by a pedal 69 to move the valve stems 48 and 66.

In the position of the parts shown in Figure 6, the connection between the valve 47 and the valve 53 is closed by a double check valve 70 in the passageway 50 on one side of the connection of the passage 55 therewith. When the brake is actuated to stop the vehicle, the parts are moved into the position shown in Figure 7, the valve stems 48 and 66 being depressed. The valve 47 moves into a closed position with reference to the port 44 so that fluid cannot flow thereto from the steering control valve 16. The valve elements 54, however, move to an open position and fluid from the pressure source entering the ports 63 travels in the direction of the arrows into the passageway 50, and against the double check valve 70. Fluid is exhausted from the opposite side of this check valve in the direction of the arrows through an opening 71 into a discharge passageway 72 and back to the reservoir. Upon exhaustion of this fluid back to the reservoir, the double check valve 70 moves into the position of Figure 7 to the opposite side of the passageway 55 so that fluid is by-passed directly from the pressure source to the ram control valve structure 57, isolating the steering control valve mechanism. Fluid exhausted from chamber 52 in the position of Figure 6 is passed through an opening 73 to the passage 72. The rams 58 and 59 are thus operable under all conditions whether the vehicle is in operation or at rest.

Having described the invention, it should be understood that modifications may be made therein without departing from the spirit of the invention or the scope of the appended claims.

What is claimed is:

1. A hydraulic power transmission system for an implement-propelling vehicle, comprising a source of fluid under pressure and a fluid circuit for distributing the fluid and returning it to the pressure source, fluid motors in the circuit receiving fluid from the pressure source for driving the vehicle, valve control means for the motors, hydraulic rams with control means therefor for operating the implements and receiving fluid under pressure from the motor control means and returning it to the pressure source, brake control means in the circuit between the motor control means and the rams having normally open valve means accommodating passage of fluid in one direction from the motor control means to the rams when the vehicle is under propulsion, a bypass valve in said brake control means having a connection with the pressure source and connected to the rams for delivering fluid thereto direct from the pressure source, said bypass valve being normally closed when the vehicle is under propulsion, actuating means associated with said brake control means for stopping the vehicle by closing the valve controlling the flow of fluid from the drive motors to the rams, and a connection between said actuating means and said bypass valve for simultaneously opening the latter to accommodate operation of the rams when the vehicle is stopped.

2. A hydraulic power transmission system for an implement-propelling vehicle, comprising a source of fluid under pressure and a fluid circuit for distributing the fluid and returning it to the pressure source, fluid motors in the circuit receiving fluid from the pressure source for driving the vehicle, valve control means for the motors, hydraulic rams with control means therefor for operating the implements and receiving fluid under pressure from the motor control means and returning it to the pressure source, brake control means in the circuit between the motor control means and the rams having normally open valve means accommodating passage of fluid in one direction from the motor control means to the rams when the vehicle is under propulsion, a bypass valve in said brake control means having a connection with the pressure source and connected to the rams for delivering fluid thereto direct from the pressure source, said bypass valve being normally closed when the vehicle is under propulsion, and actuating means associated with the brake control means operable to simultaneously close said normally open valve and to open said normally closed bypass valve, whereby when the vehicle is stopped fluid under pressure for operating the rams is received directly from the pressure source.

3. The invention set forth in claim 1, wherein a fluid passageway connects said valves together, a common fluid conduit communicates with said passageway for connecting said valves to the rams, and a double check valve is provided in said passageway movable under fluid pressure in response to manipulation of said actuating means to alternately provide communication between one of said valves and the rams.

4. A hydraulic power transmission system for an implement-propelling vehicle, comprising a source of fluid under pressure and a fluid circuit for distributing the fluid and returning it to the pressure source, fluid motors in the circuit receiving fluid from the pressure source for driving the vehicle, valve control means for the motors, hydraulic rams with control means therefor for operating the implements and receiving fluid under pressure from the motor control means and returning it to the pressure source, brake control means in the circuit between the motor control means and the rams having ports for receiving fluid from the drive control valve and the pressure source, respectively, a fluid passageway connecting said ports, a conduit communicating with said passageway for directing fluid to the ram control means, a double check valve in the passageway alternately movable to opposite sides of said conduit to accommodate passage of fluid from a selected one of said ports to the ram control means, a stop valve in the port communicating with the drive control means, brake actuating means operable in braking position to close said stop valve to cut off the flow of liquid from the drive control means, and a bypass valve in the other said port open in the braking position to accommodate passage of fluid direct from the pressure source to the ram control means.

5. A hydraulic power transmission system for an implement-propelling vehicle, comprising a source of fluid under pressure and a fluid circuit for distributing the fluid and returning it to the pressure source, fluid motors in the circuit receiving fluid from the pressure source for driving the vehicle, valve control means for the motors, hydraulic rams with control means therefor for operating the implements and receiving fluid under pressure from the motor control means and returning it to the pressure source, brake control means in the circuit between the motor control means and the rams having ports for receiving fluid from the drive control valve and the pressure source, respectively, a fluid passageway connecting said ports, a conduit communicating with said passageway for directing fluid to the ram control means, a double check valve in the passageway alternately movable to opposite sides of said conduit to accommodate passage of fluid from a selected one of said ports to the ram control means, a stop valve in the port communicating with the drive control means, a bypass valve in the other said port, and common brake actuating means operatively connected to said stop valve and said bypass valve for simultaneous actuation thereof, said actuating means being operable upon movement thereof in one direction to close the stop valve to cut off the flow of fluid from the drive control means and simultaneously open the bypass valve to accommodate passage of fluid direct from the pressure source to the ram control means.

6. The invention set forth in claim 5, wherein said stop and bypass valves are provided with valve stems operatively connected to said actuating means for moving the valve stems simultaneously in the same direction, the movement of the stop valve stem in one direction serving to close the stop valve and movement of the bypass valve stem in the same direction serving to open the associated valve.

7. The invention set forth in claim 6, wherein springs are provided for urging said valve stems in a direction to open the stop valve and to close the bypass valve.

8. In a hydraulic power transmission circuit for a vehicle having a source of fluid under pressure and fluid-motor driven traction devices, the combination in the circuit of valve mechanism for regulating the flow of fluid to the driving motors to operate the traction devices and its return to the pressure source, implements movably mounted on the vehicle, hydraulic rams for moving the implements mounted in the circuit in the path of fluid return to the pressure source from the driving motors when the vehicle is under propulsion, control means for regulating the flow of fluid to the rams for moving the implements, brake valve means in the circuit between the driving valve mechanism and the ram control means having an inlet port to receive fluid from the drive valve and a discharge port for directing the fluid to the rams, a stop valve in said inlet port for cutting off the flow of fluid to stop the drive motors, and a bypass port in the brake valve having a connection to the pressure source to receive fluid directly therefrom when said inlet port is closed.

9. In a hydraulic power transmission circuit for a vehicle having a source of fluid under pressure and fluid-motor driven traction devices, the combination in the circuit of valve mechanism for regulating the flow of fluid to the driving motors to operate the traction devices and its return to the pressure source, implements movably mounted on the vehicle, hydraulic rams for moving the implements mounted in the circuit in the path of fluid return to the pressure source from the driving motors when the vehicle is under propulsion, control means for regulating the flow of fluid to the rams for moving the implements, brake valve means in the circuit between the driving valve mechanism and the ram control means having an inlet port to receive fluid from the drive valve and a discharge port for directing the fluid to the rams, a stop valve in said inlet port for cutting off the flow of fluid to stop the drive motors, and a bypass port in the brake valve having a connection to the pressure source to receive fluid directly therefrom when said inlet port is closed, and a normally closed valve in said bypass port operable when said inlet port is closed to receive fluid direct from the pressure source and conduct it to said discharge port.

10. In a hydraulic power transmission circuit for a vehicle having a source of fluid under pressure and fluid-motor driven traction devices, the combination in the circuit of valve mechanism for regulating the flow of fluid to the driving motors to operate the traction devices and its return to the pressure source, implements movably mounted on the vehicle, hydraulic rams for moving the implements mounted in the circuit in the path of fluid return to the pressure source from the driving motors when the vehicle is under propulsion, control means for regulating the flow of fluid to the rams for moving the implements, brake valve means in the circuit between the driving valve mechanism and the ram control means having an inlet port to receive fluid from the drive valve and a discharge port for directing the fluid to the rams, a stop valve in said inlet port for cutting off the flow of fluid to stop the drive motors, and a bypass port in the brake valve having a connection to the pressure source to receive fluid directly therefrom when said inlet port is closed, a normally closed valve in said bypass port operable when said inlet port is closed to receive fluid direct from the pressure source and conduct it to said discharge port, and common operating means for the stop and bypass valves, said operating means being movable in one direction to close the stop valve while simultaneously opening the bypass valve.

11. In a hydraulic power transmission circuit for a vehicle having a source of fluid under pressure and fluid-motor driven traction devices, the combination in the circuit of valve mechanism for regulating the flow of fluid to the driving motors to operate the traction devices and its return to the pressure source, implements movably mounted on the vehicle, hydraulic rams for moving the implements mounted in the circuit in the path of fluid return to the pressure source from the driving motors when the vehicle is under propulsion, control means for regulating the flow of fluid to the rams for moving the implements, brake valve means in the circuit between the driving valve mechanism and the ram control means having an inlet port to receive fluid from the drive valve and a discharge port for directing the fluid to the rams, a stop valve in said inlet port for cutting off the flow of fluid to stop the drive motors, and a bypass port in the brake valve having a connection to the pressure source to receive fluid directly therefrom when said inlet port is closed, a normally closed valve in said bypass port operable when said inlet port is closed to receive fluid direct from the pressure source and conduct it to said discharge port, a common conduit in said brake valve means connecting said inlet and bypass ports to said discharge port, and a check valve in said conduit movable in two directions to alternately provide communication between a selected one of said inlet and bypass valves and said discharge port.

References Cited in the file of this patent

UNITED STATES PATENTS

| Number | Name | Date |
| --- | --- | --- |
| 2,111,134 | Allin | Mar. 15, 1938 |
| 2,112,466 | Maloon | Mar. 29, 1938 |
| 2,279,008 | Nathan | Apr. 7, 1942 |
| 2,301,098 | Twyman | Nov. 3, 1942 |
| 2,393,324 | Joy | Jan. 22, 1946 |
| 2,530,720 | Paulson | Nov. 21, 1950 |
| 2,562,881 | Baldwin et al. | Aug. 7, 1951 |
| 2,567,670 | Iversen et al. | Sept. 11, 1951 |